(12) United States Patent
Shajii et al.

(10) Patent No.: US 6,918,295 B1
(45) Date of Patent: Jul. 19, 2005

(54) THERMAL MASS FLOW RATE SENSOR PROVIDING INCREASED RATE OF HEAT TRANSFER TO GAS

(75) Inventors: Ali Shajii, Canton, MA (US); Paul Meneghini, Haverhill, MA (US); Leonard Myatt, Norfolk, MA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 10/816,412

(22) Filed: Apr. 1, 2004

(51) Int. Cl.$^7$ ............................................. G01F 1/68

(52) U.S. Cl. ................... 73/202.5; 73/204.21

(58) Field of Search ............................. 73/202, 202.5, 73/204.21

(56) References Cited

U.S. PATENT DOCUMENTS

| | | | |
|---|---|---|---|
| 4,522,058 A | 6/1985 | Ewing | 73/202 |
| 5,295,394 A | 3/1994 | Suzuki | 73/202 |
| 6,318,171 B1 | 11/2001 | Suzuki | 73/204.27 |

*Primary Examiner*—Harshad Patel
(74) *Attorney, Agent, or Firm*—McDermott Will & Emery LLP

(57) ABSTRACT

A sensing apparatus for use in a mass flow rate sensor for measuring a fluid flow rate includes a main conduit for containing a fluid flow, and a capillary tube for tapping a portion of the fluid flow from the main conduit at a first location, and returning the portion of the fluid flow to the conduit at a second location. The capillary tube is disposed about a centerline, and includes an inner wall defined by an inside radius measured from the centerline. The inside radius varies periodically, preferably sinusoidally, along the centerline for at least a portion of the capillary tube, thereby forming a turbulated surface on the inner wall. The turbulated inner wall increases wall surface area, and fluid mixing. The resulting increased heat transfer rate decreases the error in sensor output from nonlinear behavior.

20 Claims, 4 Drawing Sheets

THERMAL MASS FLOW RATE SENSOR PROVIDING INCREASED RATE OF HEAT TRANSFER TO GAS

FIELD OF THE DISCLOSURE

The present disclosure relates to mass flow rate sensors, and more particularly, to a thermal based mass flow rate sensor providing an increased rate of heat transfer to gas flowing through the sensor.

BACKGROUND OF THE DISCLOSURE

In the semiconductor manufacturing industry, it is necessary to achieve precise control of the quantity, temperature and pressure of one or more reactant materials which are delivered in a gaseous state to a reaction chamber. Mass flow controllers are widely used in the semiconductor manufacturing industry to control the delivery of process reactants. A mass flow controller generally includes a mass flow rate sensor for measuring the rate of flow of gas through the controller, a valve for controlling the flow of gas through the controller and a computer connected to the mass flow rate sensor and the valve. The computer is programmed with a desired flow rate, which the computer compares to an actual flow rate as measured by the mass flow rate sensor. If the actual flow rate does not equal the desired flow rate, the computer is further programmed to open or close the valve until the actual flow rate equals the desired flow rate.

Thermal mass flow controllers operate on the principle that the rate of heat transfer from the walls of a flow channel to a fluid flowing in laminar flow within the channel is a function of the difference in temperatures of the fluid and the channel walls, the specific heat of the fluid, and the mass flow rate of the fluid. Thus, the rate of mass flow of a fluid (in the laminar flow regime) can be determined if the properties of the fluid and the temperatures of the fluid and tube are known.

One class of thermal mass flow rate sensors employs a capillary tube as the primary sensing mechanism, as shown in the exemplary prior art mass flow rate sensor 10 of FIG. 1. In such a device, a capillary tube 12 diverts a portion 14 of the main flow 16 propagating through the primary conduit 18. It is important to note that this figure is not necessarily to scale. Typically the capillary tube 12 is significantly smaller than the primary conduit 18, but is shown somewhat large in FIG. 1 for clarity. Generally one or more heating elements 20 attach to the capillary tube 12 to allow a heat transfer from the heating elements 20, through the tube 12 and to the fluid. The heating elements 20 also serve as resistance temperature sensors that track the local temperature of the tube wall. Heat transfer between the fluid 14 flowing in the capillary tube 12 from the tube walls is a function of the difference between the fluid temperature and the wall temperature, and the heat transfer rate coefficient inside of the tube. The increase in gas temperature between the two coils is a function of the mass flow rate of the gas and the specific heat of the fluid. A circuit converts the difference in resistance (or temperature) of the two coils 20 into a voltage output which is calibrated to a known flow source.

Ideally, the output of the sensor of FIG. 1 should be a linear function of the flow rate Q through the sensor. For practical sensors, however, the output of the sensor is a linear function of the flow rate Q through the sensor only for a limited range. At an upper limit flow rate, the practical curve diverges from the ideal curve, i.e., becomes nonlinear, Practical sensors consequently operate with either a reduction of flow range of an increase in error due to the nonlinear signal. In addition, the degree of non-linearity of the output of the practical sensor at higher flow rates is highly dependent on gas properties, which limits the accuracy of the gas correction factors used for to convert the calibration to other gasses.

It is an object of the present disclosure to substantially overcome the above-identified disadvantages and drawbacks of the prior art and provide an improved thermal mass flow rate sensor having increased sensitivity, range and accuracy. Preferably, the improved thermal mass flow rate sensor will provide an increased heat transfer rate between the heating elements and fluid in the capillary tube of the sensor.

SUMMARY OF THE DISCLOSURE

The present disclosure provides a sensing apparatus for use in a mass flow rate sensor for measuring a fluid flow rate. The apparatus includes a main conduit for containing a fluid flow, and a capillary tube for tapping a portion of the fluid flow from the main conduit at a first location, and returning the portion of the fluid flow to the conduit at a second location. The capillary tube is disposed about a centerline, and includes an inner wall defined by an inside radius measured from the centerline. The inside radius varies along the centerline for at least a portion of the capillary tube, thereby forming a turbulated surface on the inner wall.

The turbulated inner wall of the capillary tube increases the heat transfer rate coefficient between the fluid and the wall of the capillary tube. Among other features and benefits, the present disclosure provides an improved thermal mass flow rate sensor having increased sensitivity, range and accuracy.

According to one aspect of the present disclosure, the inside radius varies periodically along the centerline. According to another aspect, the inside radius varies sinusoidally along the centerline. According to an additional aspect, the inside radius varies continuously from the first location to the second location to provide the turbulated inner wall. According to a further aspect, the radius varies along two or more segments of the centerline, each segment separated by regions characterized by substantially constant inside radius. According to yet another aspect of the present disclosure, the radius varies along a segment of the centerline, the radius is substantially constant along the centerline from the first location to the segment of the centerline, and the radius is substantially constant along the centerline from the segment to the second location.

According to a further aspect of the present disclosure, the turbulated surface on the inner wall of the capillary tube is formed by drilling the capillary tube along the centerline. According to still another aspect, the turbulated surface on the inner wall of the capillary tube is formed by reaming the capillary tube along the centerline. According to another aspect, the turbulated surface on the inner wall of the capillary tube is formed by electrochemical drilling the capillary tube along the centerline. According to an additional aspect, the turbulated surface on the inner wall of the capillary tube is formed by laser etching the capillary tube.

In another aspect of the present disclosure, a disclosed method of measuring a fluid flow rate provides a substantially linear output at higher flow rates than that of the prior art sensors. The method includes providing a main conduit for containing a fluid flow, and providing a capillary tube for tapping a portion of the fluid flow from the main conduit at a first location, and returning the portion of the fluid flow to the conduit at a second location. The capillary tube is disposed about a centerline, and includes an inner wall defined by an inside radius measured from the centerline. The method further includes varying the inside radius along the centerline for at least a portion of the capillary tube, thereby forming a turbulated surface on the inner wall.

BRIEF DESCRIPTION OF THE DRAWINGS

The foregoing and other objects of this disclosure, the various features thereof, as well as the disclosure itself, may be more fully understood from the following description, when read together with the accompanying drawings in which.

Elements having the same reference character designations represent like elements throughout the drawings.

DETAILED DESCRIPTION OF EXEMPLARY EMBODIMENTS

Figure 1:
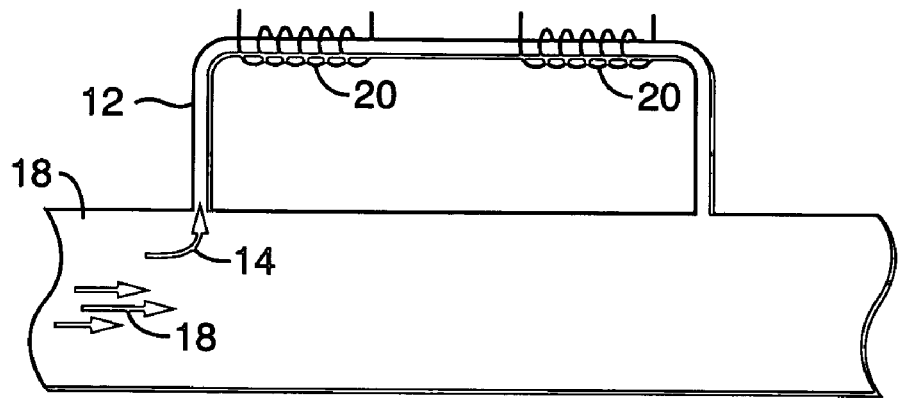
FIG. 1 shows an exemplary embodiment of a mass flow rate sensor constructed in accordance with the prior art.
Figure 2:
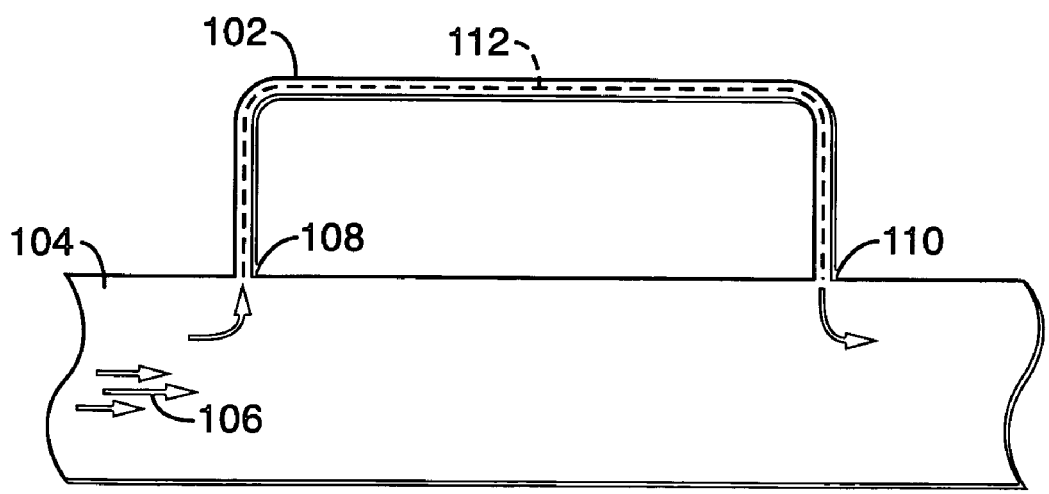
FIG. 2 shows a sectional view of an exemplary embodiment of a mass flow rate sensor apparatus constructed in accordance with the present disclosure and including a main conduit and a capillary tube for tapping a portion of the fluid flow from the main conduit at a first location and returning the portion of the fluid flow to the conduit at a second location.

FIG. 2 shows a sectional view of an exemplary embodiment of a sensor apparatus 100 for use in a mass flow rate sensor. By using a turbulated capillary sensor tube 102, as shown in FIG. 2, the sensor apparatus 100 provides an output that exhibits a substantially linear output with respect to the fluid flow rate through the sensor.

The sensor apparatus 100 includes a main conduit 104 that contains and channels a fluid 106 and the capillary sensor tube 102, which taps and diverts a portion of the fluid 106 from the main conduit 104 at a first location 108, and returns the diverted fluid to the main conduit 104 at a second location 110. As shown best in FIG. 3, the capillary tube 102 is disposed about a centerline 112, and is characterized by an inner radius 114 and an outer radius 116. The inner radius 114 essentially defines an inner wall of the capillary tube 102. The capillary tube 102 is designed and fabricated such that the inner radius 114 varies as a function of the location along the centerline 112. These variations in the inner radius 114 form a turbulated surface on the inner wall.

In one embodiment, the inside radius 114 varies periodically along the centerline 112, so as to repeat at least one cycle from the first location 108 to the second location 110. In the embodiment shown in FIGS. 2 and 3, the inner radius 114 varies sinusoidally from the first location 108 to the second location, although other embodiments may use alternative periodic variations. Further, some embodiments may use non-periodic variations of the inner radius 114 in order to form a turbulated surface at the inner wall.

Figure 3:
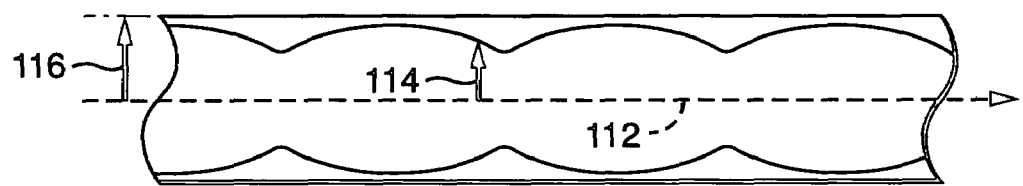
FIG. 3 shows an enlarged sectional view of a portion of the capillary tube of the mass flow rate sensor apparatus of FIG. 2.
Figure 4:
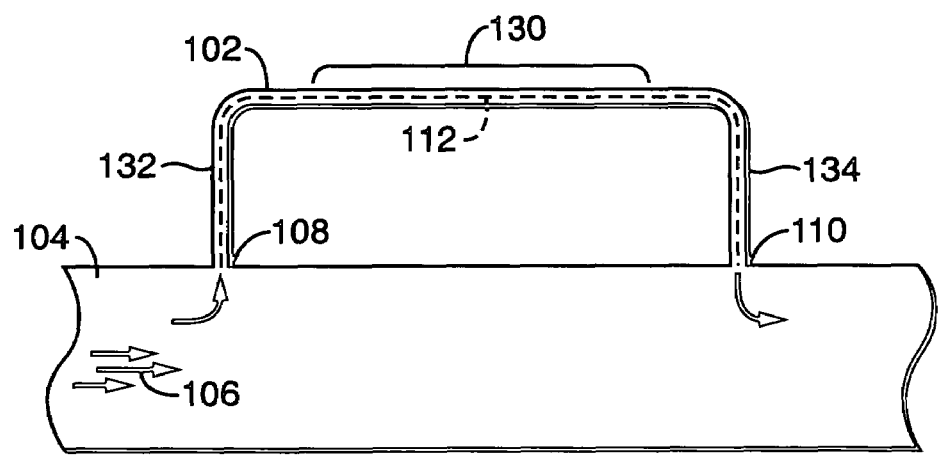
FIG. 4 shows another exemplary embodiment of a mass flow rate sensor apparatus constructed in accordance with the present disclosure.

Although the embodiments shown in FIGS. 2 and 3 show the turbulated surface extending along the entire length of the capillary tube 102, in some embodiments the inner radius 114 only varies in particular regions of the capillary tube 102, while the inner radius 114 remains constant in other regions. For example, as in the exemplary embodiment of FIG. 4, the inner radius 114 may vary only in the middle portion 130 of the capillary tube, while the first portion 132 of the tube 102 from the first location 108 to the turbulated portion 130 has a constant inner radius 114, and the second portion 134 of the tube 102 from the turbulated portion 130 to the second location 110 also has a constant inner radius 114. In other embodiments, the capillary tube 102 may include two or more turbulated portions, separated by regions of constant inner radius 114 (i.e., non-turbulated regions).

In the embodiment shown in FIGS. 2 and 3, the walls of the capillary tube 102 are turbulated all about the centerline 112. In other embodiments, the inner radius 114 may vary only at particular angles about the centerline 112. In this way, the only portions of the inner wall are turbulated for a given point along the centerline 112.

The varying inner radius 114 as described herein may be fabricated by any suitable means known in the art. For example, in one embodiment, the varying inner radius 114 is fabricated by drilling or reaming the capillary tube 112 via an electro-chemical drilling (ECD) process. In another embodiment, the varying inner radius 114 is fabricated by a mechanical drilling process in which the diameter of the cutting mechanism changes as the cutting mechanism progresses through the capillary tube 112. Other embodiments may fabricate the varying inner radius 114 via a laser etching process or a chemical etching process. Still other embodiments may fabricate the varying inner radius 114 by depositing material in the inner wall of the capillary tube, i.e., creating a turbulated surface by adding material to the capillary tube inner wall.

The turbulated inner wall of the capillary tube 112 increases the heat transfer rate between the fluid and the wall of the capillary tube 112 via two mechanisms; (i) increased wall surface area, and (ii) increased fluid mixing. Among other features and benefits, the present disclosure provides an improved thermal mass flow rate sensor having increased sensitivity, range and accuracy.

Figure 5:
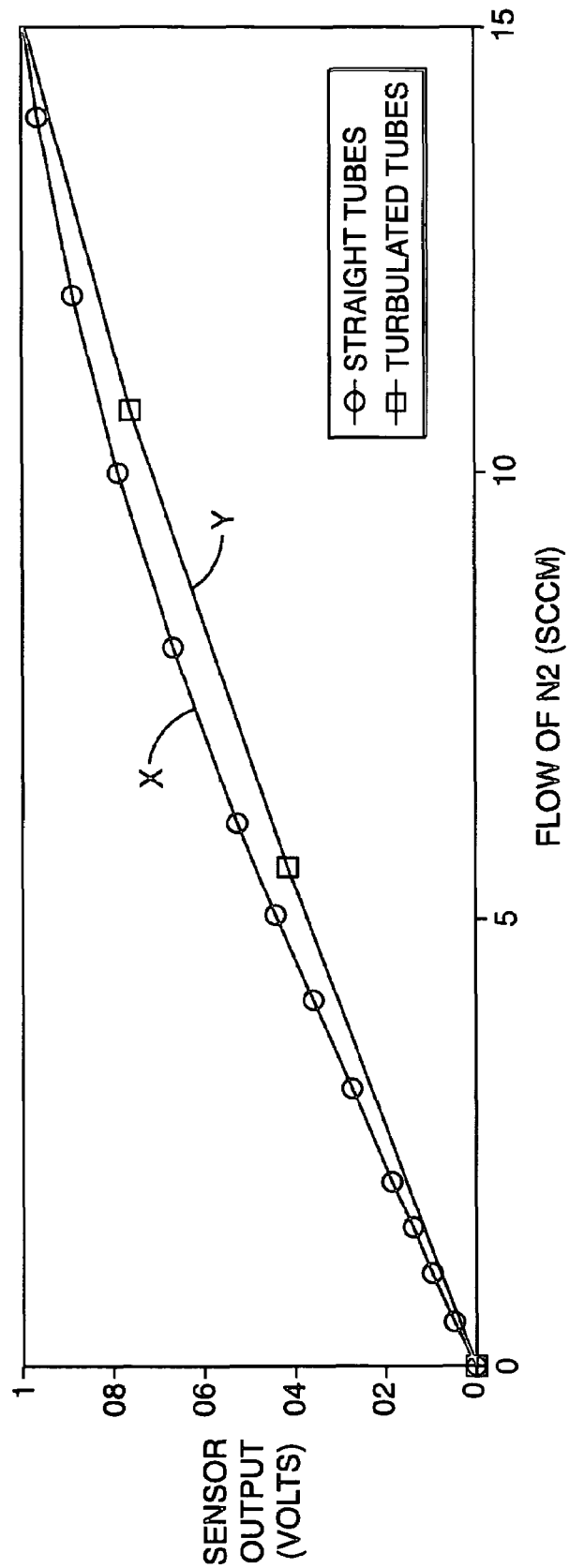
FIGS. 5 and 6 are graphs illustrating test data of nitrogen flow verses sensor output voltage and sensor output linearity for a mass flow rate sensor apparatus constructed in accordance with the present disclosure and a mass flow rate sensor apparatus constructed in accordance with the prior art.
Figure 6:
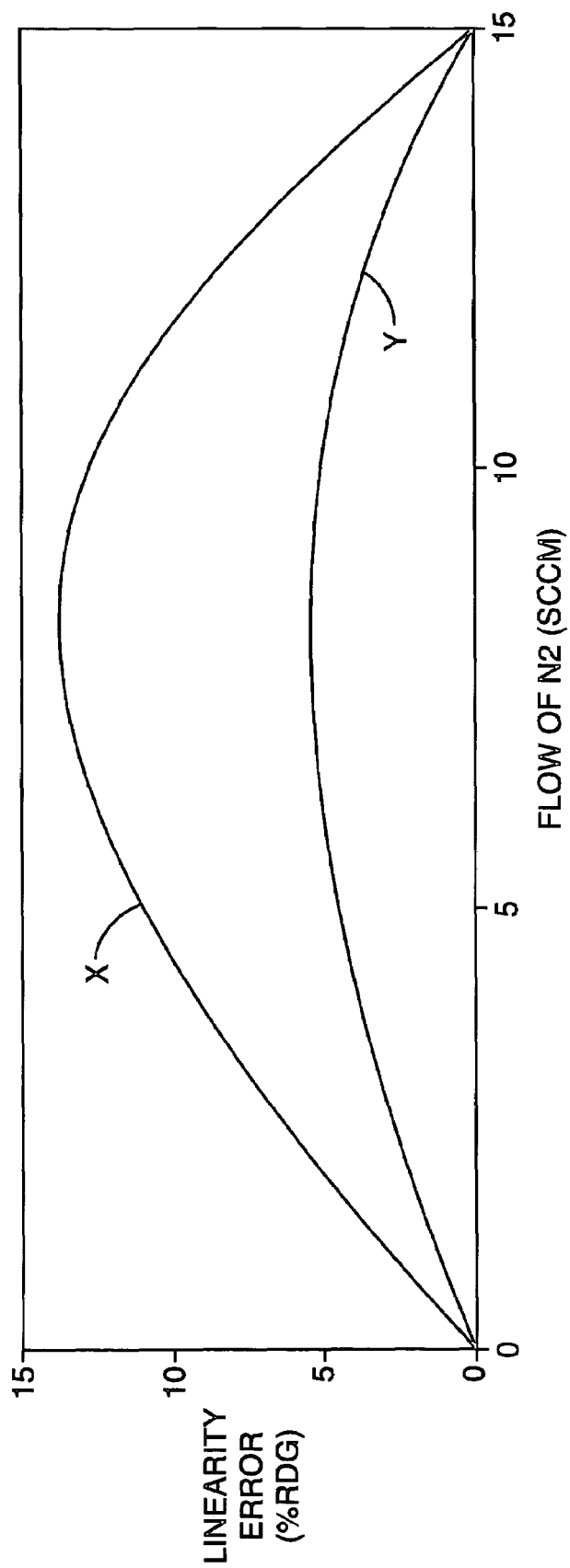

FIGS. 5 and 6 are graphs illustrating test data of nitrogen flow verses sensor output voltage and sensor output linearity, respectively, for a mass flow rate sensor apparatus constructed in accordance with the present disclosure (as represent by lines "Y") and a mass flow rate sensor apparatus constructed in accordance with the prior art (as represent by lines "X").

The disclosure may be embodied in other specific forms without departing from the spirit or essential characteristics thereof. The present embodiments are therefore to be considered in respects as illustrative and not restrictive, the scope of the disclosure being indicated by the appended claims rather than by the foregoing description, and all changes which come within the meaning and range of the equivalency of the claims are therefore intended to be embraced therein.

What is claimed is:

1. A sensing apparatus for use in a mass flow rate sensor for measuring a fluid flow rate, comprising:
   a main conduit for containing a fluid flow; and,
   a capillary tube, disposed about a centerline, for tapping a portion of the fluid flow from the main conduit at a first location, and returning the portion of the fluid flow to the conduit at a second location, the capillary tube including an inner wall, defined by an inside radius measured from the centerline;
   wherein the inside radius of the capillary tube varies along the centerline for at least a portion of the capillary tube, thereby forming a turbulated surface on the inner wall.

2. A sensing apparatus according to claim 1, wherein the inside radius varies periodically along the centerline.

3. A sensing apparatus according to claim 1, wherein the inside radius varies sinusoidally along the centerline.

4. A sensing apparatus according to claim 1, wherein the inside radius varies continuously from the first location to the second location.

5. A sensing apparatus according to claim 1, wherein the radius varies along two or more segments of the centerline, each segment separated by regions characterized by substantially constant inside radius.

6. A sensing apparatus according to claim 1, wherein (i) the radius varies along a segment of the centerline, (ii) the radius is substantially constant along the centerline from the first location to the segment of the centerline, and (iii) the radius is substantially constant along the centerline from the segment to the second location.

7. A sensing apparatus according to claim 1, wherein the turbulated surface on the inner wall of the capillary tube is formed by drilling the capillary tube along the centerline.

8. A sensing apparatus according to claim 1, wherein the turbulated surface on the inner wall of the capillary tube is formed by reaming the capillary tube along the centerline.

9. A sensing apparatus according to claim 1, wherein the turbulated surface on the inner wall of the capillary tube is formed by electro-chemical drilling the capillary tube along the centerline.

10. A sensing apparatus according to claim 1, wherein the turbulated surface on the inner wall of the capillary tube is formed by laser etching the capillary tube.

11. A method of measuring a fluid flow rate that provides a substantially linear output at higher flow rates, comprising:
    providing a main conduit for containing a fluid flow; and,
    providing a capillary tube, disposed about a centerline, for tapping a portion of the fluid flow from the main conduit at a first location, and returning the portion of the fluid flow to the conduit at a second location, the capillary tube including an inner wall, defined by an inside radius measured from the centerline; and,
    varying the inside radius along the centerline for at least a portion of the capillary tube, thereby forming a turbulated surface on the inner wall.

12. A method according to claim 11, further including varying the inside radius periodically along the centerline.

13. A method according to claim 11, further including varying the inside radius sinusoidally along the centerline.

14. A method according to claim 11, further including varying the inside radius continuously from the first location to the second location.

15. A method according to claim 11, further including varying the radius along two or more segments of the centerline, each segment separated by regions characterized by substantially constant inside radius.

16. A method according to claim 11, further including (i) the varying radius along a segment of the centerline, (ii) maintaining the radius substantially constant along the centerline from the first location to the segment of the centerline, and (iii) maintaining the radius substantially constant along the centerline from the segment to the second location.

17. A method according to claim 11, further including forming the turbulated surface on the inner wall of the capillary tube by drilling the capillary tube along the centerline.

18. A method according to claim 11, further including forming the turbulated surface on the inner wall of the capillary tube by reaming the capillary tube along the centerline.

19. A method according to claim 11, further including forming the turbulated surface on the inner wall of the capillary tube by electro-chemical drilling the capillary tube along the centerline.

20. A method according to claim 11, further including forming the turbulated surface on the inner wall of the capillary tube by laser etching the capillary tube.

* * * * *